United States Patent [19]
Fox

[11] Patent Number: 5,614,890
[45] Date of Patent: Mar. 25, 1997

[54] PERSONAL IDENTIFICATION SYSTEM

[75] Inventor: Thomas M. Fox, Gilbert, Ariz.

[73] Assignee: Motorola, Inc., Schaumburg, Ill.

[21] Appl. No.: 173,033

[22] Filed: Dec. 27, 1993

[51] Int. Cl.$^6$ ...................................................... H04Q 1/00
[52] U.S. Cl. ........................... 340/825.34; 340/825.54; 340/572; 343/703; 119/51.02
[58] Field of Search ..................... 340/825.31, 825.34, 340/825.69, 825.72, 825.54, 572, 573; 343/703, 841; 119/51.02

[56] References Cited

U.S. PATENT DOCUMENTS

| | | | |
|---|---|---|---|
| 3,541,995 | 11/1970 | Fathauer | 119/51.02 |
| 3,898,984 | 8/1975 | Mandel et al. | 128/2.1 A |
| 4,171,684 | 10/1979 | Herr | 119/51.02 |
| 4,259,665 | 3/1981 | Manning | 340/575 |
| 4,342,986 | 8/1982 | Buskirk et al. | 340/539 |
| 4,559,526 | 12/1985 | Tani et al. | 340/539 |
| 4,598,275 | 7/1986 | Ross et al. | 340/573 |
| 4,622,544 | 11/1986 | Bially et al. | 340/636 |
| 4,665,387 | 5/1987 | Cooper et al. | 340/572 |
| 4,672,155 | 6/1987 | Naruse | 178/19 |
| 4,675,656 | 6/1987 | Narcisse | 340/539 |
| 4,747,120 | 5/1988 | Foley | 379/38 |
| 4,812,823 | 3/1989 | Dickerson | 340/572 |
| 4,924,211 | 5/1990 | Davies | 340/573 |
| 5,103,474 | 4/1992 | Stoodley et al. | 379/58 |
| 5,300,939 | 4/1994 | Meada | 343/703 |

FOREIGN PATENT DOCUMENTS 51-312865  11/1993  Japan .

*Primary Examiner*—Brian Zimmerman
*Attorney, Agent, or Firm*—Frank J. Bogacz

[57] ABSTRACT

A personal identification system includes a number of antenna preamplifier nodes coupled to collection nodes which are in turn coupled to a central computer. A personal detector unit attached to a user is inserted into an enclosure of the antenna preamplifier node. The antenna preamplifier node is electrically isolated by RF attenuation material. An antenna of the antenna preamplifier node is a low gain antenna. The antenna preamplifier node reads a coded radio frequency signal of a personal detector unit inserted into an enclosure and rejects signals of other various personal detector units in the vicinity.

20 Claims, 2 Drawing Sheets

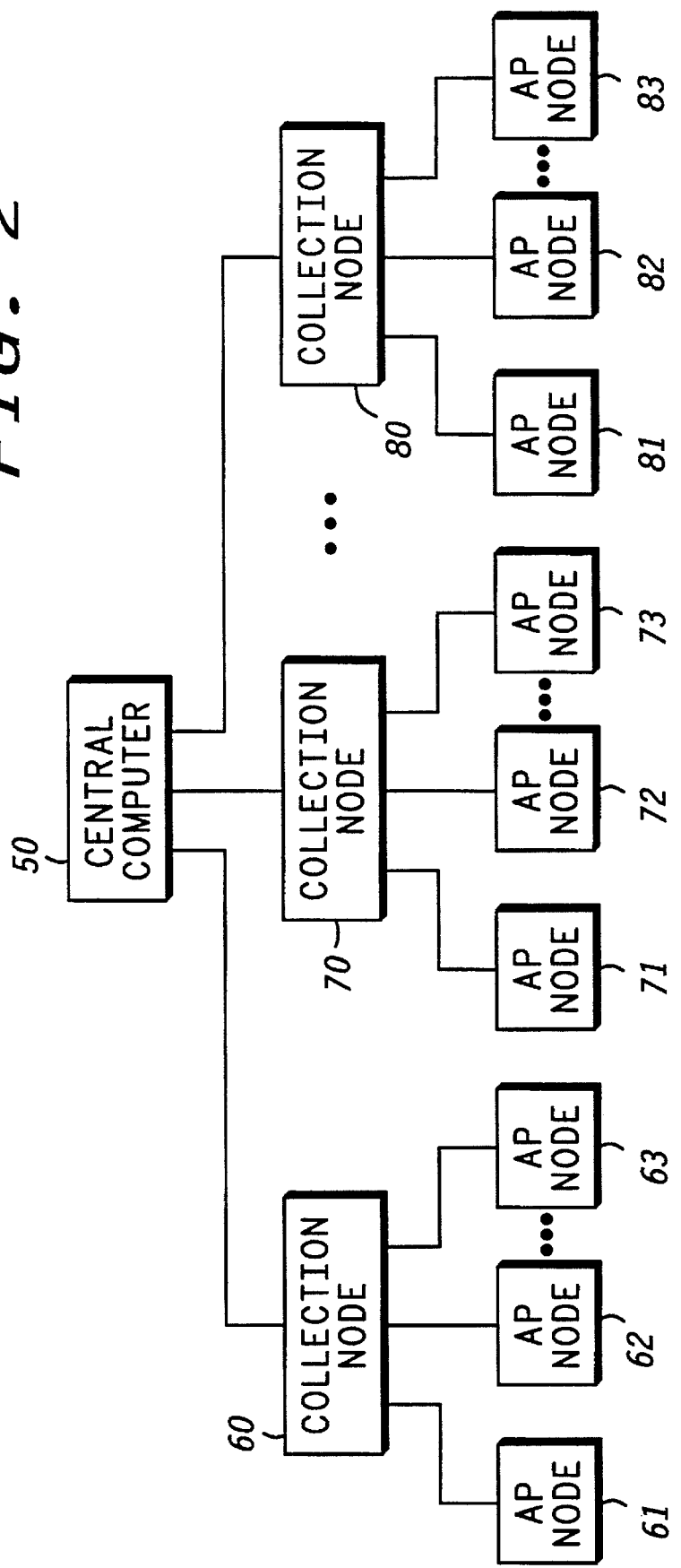

PERSONAL IDENTIFICATION SYSTEM

BACKGROUND OF THE INVENTION

The present invention pertains to personal identification systems and more particularly to a remote tracking and access control system for individuals in an institutional setting.

It is highly desirable to track individuals and to permit access by certain individuals to certain facilities in an institutional setting. For example, it is advantageous to be able to monitor and track prisoners within a prison system. It is equally advantageous to monitor access by patients in a hospital to various facilities.

In the prisoner situation, prisoners may be allowed or denied access to food lines, certain areas of the prison such as an exercise yard or a particular cell block.

In the hospital scenario, the patient may be allowed access to certain areas of the hospital or access to certain medications or therapy.

Present systems utilize badges with bar codes which may be scanned by a scanning system and appropriate action taken. However, these bar code systems are not uniform and several different systems may be required to exist within an institution such as a prison or a hospital.

Therefore, it would be highly desirable to have an inexpensive identification system for each institutional user which can readily discriminate among users for tracking and controlling user's access to various facilities.

BRIEF DESCRIPTION OF THE DRAWINGS

FIG. 2 is a block diagram of a identification system in accordance with the present invention.

DESCRIPTION OF THE PREFERRED EMBODIMENT

Figure 1:
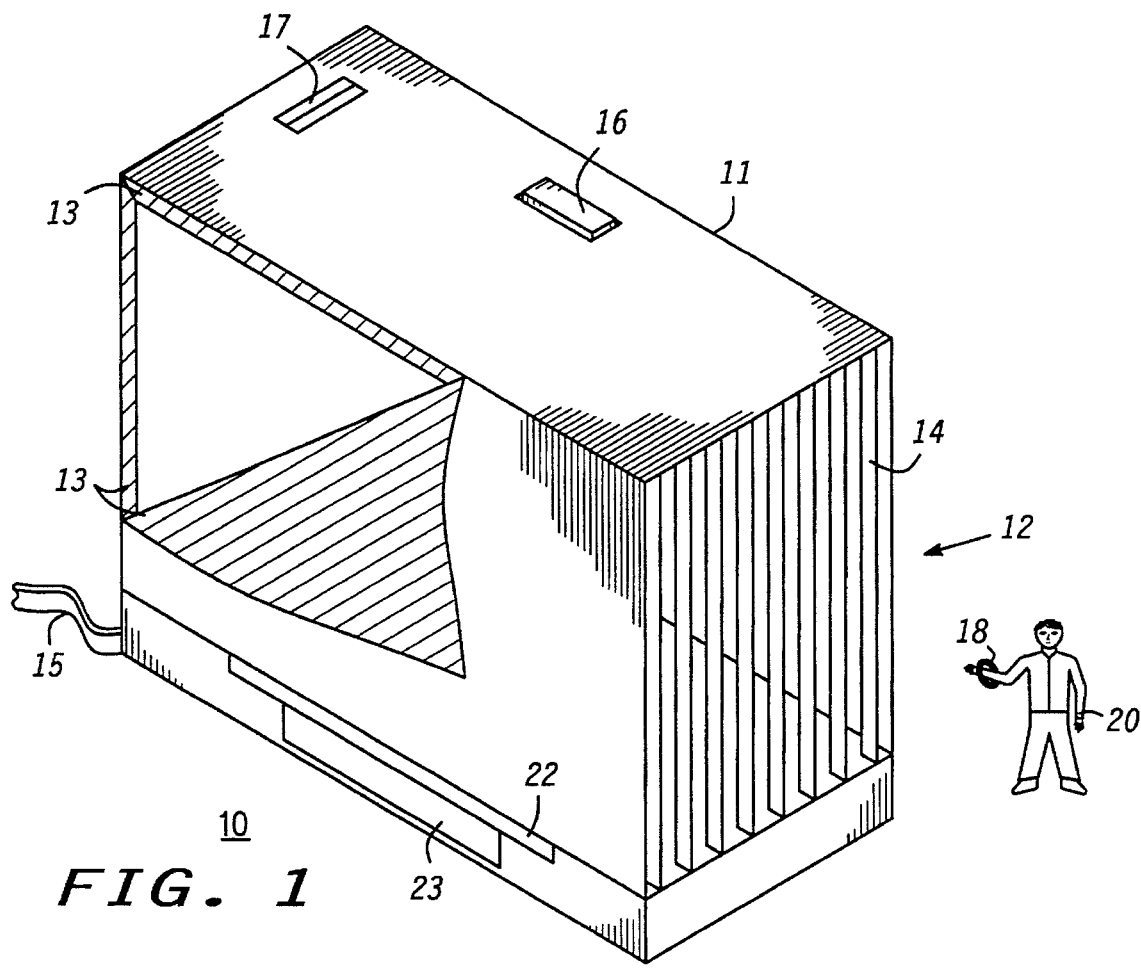
FIG. 1 is a cutaway section diagram of an antenna preamplifier node in accordance with the present invention.

Referring to FIG. 1, a cutaway isometric view of an antenna preamplifier node (AP node) 10 is shown. AP node 10 includes enclosure 11. In its preferred embodiment, enclosure 11 is rectangular in shape having one end 12 open (non-enclosed). Enclosure 11 may be made of wood, plastic, cardboard, or in its preferred embodiment metal to inhibit transmissions of electronic signals inside the interior of enclosure 11 to the exterior of enclosure 11 and inhibits transmission of electronic signals from outside enclosure 11 to the interior of enclosure 11. A metallized plastic material 13 is affixed to the interior of the enclosure except for opening 12. The metallized plastic material 13 is affixed to the interior of enclosure 11 by double sided tape (not shown). The double sided tape may be the kind as manufactured by the 3M Corporation, Part No. 3M 467 tape. The metallized plastic material 13 may be the kind manufactured by 3M Corporation, Part No. 2100E Embossed Static Shielding Bag.

The upper left corner of enclosure 11 is shown in cutaway section depicting metallized plastic material 13 being affixed to the inside of enclosure 11 except for opening 12. The purpose of metallized plastic 13 is to attenuate any electronic signals from outside enclosure 11 from entering into the interior of enclosure 11. Strips 14 of the metallized plastic material are hung in a curtain fashion covering opening 12 so that extraneous electronic signals from outside the enclosure 11 are attenuated when entering the enclosure 11 through opening 12. Coaxial cable 15 connects these electronic signals to and from AP node 10 to and from a collection node as will be discussed infra.

Activation switch 16 is mounted to the exterior of enclosure 11 on an outer surface preferably the top. Activation button 16 is coupled to AP node electronics 23 and provides for activation of the AP node 10.

Annunciator 17 is also mounted on the exterior of enclosure 11 preferably the top. Annunciator 17 provides an audio-visual queue to the user of AP node 10 when a signal has been received and processed by the system. These queues may be speech oriented, sound oriented, or visual such as lighting a light. AP node antenna 22 is mounted on an inner surface of the interior of enclosure 11 over the metallized plastic material 13. AP node antenna 22 is a low gain antenna and receives signals from a personal detector unit and transmits this signal through AP node electronics 23 to the collection node via coaxial cable 15.

Referring to FIG. 2, a block diagram of AP nodes, collection nodes, and a central computer for implementing the personal identification system is shown. Central computer 50 is coupled to a number of collection nodes 60–80, for example. Collection node 60 is coupled to a number of AP nodes 61–63. Similarly, collection node 70 is coupled to a number of AP nodes 71–73. Also, collection node 80 is coupled to a number of AP nodes 81–83. The precise operation of AP nodes 61–83 will be discussed in detail later; however, AP nodes 61–83 transmit coded radio frequency signals to their respective collection nodes 60–80. Collection nodes 60–80 interface with central computer 50 which determines whether the coded radio frequency signals transmitted is valid and the exact location of a personal detector unit 18 as shown in FIG. 1. Central computer 50 then transmits access privileges or denial thereof through the respective collection nodes 60–80 to the particular AP node 61–83 which has initiated the transmission. Computer 50 may be coupled to collection nodes 60–80 by an RF communication link (wireless) or a wireline connection. Similarly, AP nodes 61–63, 71–73, and 81–83 may be respectively coupled to collections nodes 60, 70, and 80 by an RF communication link (wireless) or a wireline connection.

Figure 3:
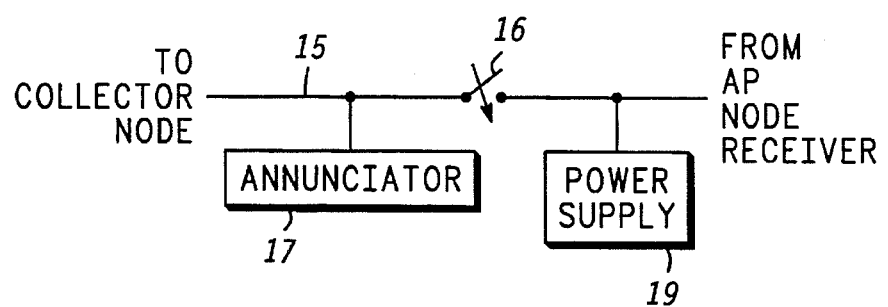
FIG. 3 is a schematic diagram of the interconnection of antenna preamplifier nodes in accordance with the present invention.

Referring to FIG. 3, a schematic diagram of the activation switch 16 enabling transmission of signals from and to the AP node, from and to collector node, powered by power supply 19 via coax 15. When activation switch 16 is depressed, coded signals are sent from personal detector units 18 from the AP node 10 through coax 15 to a collection node such as collection node 60. Collection node 60 then interfaces with central computer 50 and transmits the coded radio frequency signals to central computer 50 for analysis and the granting or denial of an access request, for example. Annunciator 17 is also coupled to coax 15 to receive and display to user 20 that his/her access request has been received by central computer 50 and has been processed.

Referring again to FIG.1, a user (a prisoner or a patient) 20 wears an active radio frequency transmitter 18 which is a personal detector unit. One such personal detector unit is manufactured by Motorola, Inc., Part No. 01-P36930H. Personal detector unit 18 transmits a coded radio frequency signals which uniquely identifies user 20 as compared to all other users, for example. Enclosure 11 is an RF shielded enclosure. AP node receiver electronics 23 has its gain adjusted to detect only personal detector unit 18 when it is inserted into opening 12 of enclosure 11 and not detect any of the other personal detector units that may be in the immediate vicinity. PDU 18 may be firmly affixed to a wrist or ankle of the user or worn as an accessory by a user. User 20 would insert his/her hand or leg with the PDU 18 attached through the curtain 14 of opening 12 into the interior of enclosure 1!. PDU 18 transmits the coded radio frequency signal which is received by AP node antenna 22 which may comprise a low gain flat plate antenna tuned to a selected PDU transmit frequency which is typically about 900 MHz. The metallized plastic material 13 and curtain of metallized plastic material 14 provide an RF shielded enclosure 11 to help prevent AP node antenna 22 from receiving signals from PDUs which are not inserted into enclosure 11. These unwanted signals would be false signals and generate errors as to the location of certain prisoners or patients. The antenna 22 and node electronics receiver 23 may be mounted at various locations outside enclosure 11, however, below enclosure 11 is preferable for manufacturing reasons. The gain of receiver 23 and antenna 22 of AP node electronics 23 is reduced to minimize the receipt of the unwanted signals from outside of enclosure 11.

Once the user has inserted the PDU 18 into enclosure 11, activation switch 16 is then enabled. In its preferred embodiment activation switch may comprise a push button switch. When activation switch 16 is enabled, AP node electronics receiver 23 gathers the signal from PDU 18 and transmit via coax 15 to a collection node, such as collection node 60. The momentary activation of activation switch 16 further reduces the probabilities of receipt of unwanted signals since the coded signal from PDU 18 is only sent to the collector node during the time activation switch is depressed. Activation switch 16 may control the electronics 23 power or may connect the coded radio frequency signal to the wire that transmits the signal to the collector node. The preferred approach is to connect the switch 16 to the coded radio frequency signal allowing the receiver to be continuously powered on and to eliminate transient signals due to turn on and turn off of the AP node electronics 23. The coded radio frequency signal comprises a series of binary ones and zeros that represent the particular coded PDU and uniquely identified a patient or prisoner, for example. The PDU data is sent using a spread spectrum signal. In a prison environment, the AP node may also be used to identify the location and access privileges for prison guards or prison staff.

The coded radio frequency signal is transmitted from AP node 10 to a collection node such as collection node 60, for example. Collection node 60 transmits this coded signal at the appropriate time to central computer 50. Central computer 50 determines whether the user represented by this coded signal is allowed the particular access which he or she is attempting to make. Central computer 50 then transmits the access grant or denial information through collector node 60 to AP node 10. At this time, annunciator 17 indicates to the prisoner or patient 20 that he or she no longer needs to push activation switch 16. The access denial or grant information would then be transmitted from AP node 10 to downstream electronics to operate a gate or door, for example. Other functions may include monitoring access to food or debiting a prisoner's or patient's account for the purchase items in a prison or hospital store. Many other access granting privileges may be controlled by this arrangement.

The antenna preamplifier node 10 as shown and described above provides a tamperproof identification method for prison settings including correctional staff and inmates of prisons and patients of hospitals or other institutions. The RF shielded enclosure 11 with the metallized plastic material 13 enables a small enclosure to be utilized for such system with very inexpensive shielding material. It also affords a simplicity of design.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A user interface node for a personal identification system comprising:

an enclosure having an open end, an exterior and an interior;

first RF attenuation material affixed to said interior of said enclosure;

second RF attenuation material affixed to said open end of said enclosure, said second RF attenuation material being in a strip curtain form to allow insertion of an object into said enclosure;

an antenna mounted in said interior of said enclosure for receiving a radio frequency signal from said object inside said enclosure;

a user of said personal identification system, said user having a personal detector unit for transmitting a coded radio frequency signal, said personal detector unit attached to said user, said personal detector unit being inserted through said second RF attenuation material into said interior of said enclosure; and a receiver for receiving said coded radio frequency signal of said user's personal detector unit, said receiver coupled to said antenna and to said personal detector unit by said radio frequency signal.

2. A user interface node as claimed in claim 1, wherein said first and second RF attenuation materials form a contiguous three-dimensional attenuation barrier between said coded radio frequency signal in the interior of said enclosure and any other radio frequency signals outside said enclosure, said first and second RF attenuation material in close proximity to each other.

3. A user interface node as claimed in claim 1, wherein said first and said second RF attenuation materials each comprise a metallized plastic material.

4. A user interface node as claimed in claim 3, wherein said metallized plastic material comprises static shielding bag material.

5. A user interface node as claimed in claim 1, wherein there is further included a switch coupled to said receiver for activating said receiver to re-transmit said coded radio frequency signal to a remote collection node, said switch coupled to said receiver and to said collection node.

6. A user interface node as claimed in claim 5, wherein there is further included a power supply for operating said receiver, said power supplied coupled to said receiver and to said switch.

7. A user interface node as claimed in claim 6, wherein there is further included a communication link for coupling said coded radio frequency signal from said receiver to said collection node, said communication link coupled to said collection node and to said receiver.

8. A user interface node as claimed in claim 7, wherein said communication link includes coaxial cable.

9. A user interface node as claimed in claim 7, wherein said communication link includes a wireless radio frequency transmission link.

10. A user interface node as claimed in claim 7, wherein there is further included an annunciator for indicating to said user that the coded radio frequency signal has been processed by a central computer, said annunciator coupled to said central computer via said communication link and to said switch and to said power supply, said annunciator affixed to said exterior of said enclosure.

11. A user interface node as claimed in claim 1, wherein said antenna includes a low gain antenna mounted in said interior of said enclosure, said low gain antenna for rejecting coded radio frequency signals from personal detector units located outside said interior of said enclosure.

12. A personal identification system for uniquely detecting the identity and location of a user comprising:

a computer;

at least one collection node for receiving a plurality of coded radio frequency signals, said at least one collection node coupled to said computer;

at least one antenna preamplifier node for receiving said coded radio frequency signals from said user and transmitting said coded radio frequency signals to said at least one collection node, said at least one antenna preamplifier node coupled to said at least one collection node; and said at least one antenna preamplifier node including:

an enclosure having an open end, an exterior and an interior;

first RF attenuation material affixed to said interior of said enclosure;

second RF attenuation material affixed to said open end of said enclosure, said second RF attenuation material being in a strip curtain form to allow insertion of an object into said enclosure;

an antenna mounted in said interior of said enclosure for receiving a radio frequency signal from said object inside said enclosure;

a user of said personal identification system, said user having a personal detector unit for transmitting a coded radio frequency signal, said personal detector unit attached to said user, said personal detector unit being inserted through said second RF attenuation material into said interior of said enclosure; and a receiver for receiving said coded radio frequency signal of said user's personal detector unit, said receiver coupled to said antenna and to said personal detector unit by said radio frequency signal.

13. A personal identification system as claimed in claim 12, wherein there is further included a wireline connection for coupling said computer to each of a plurality of said collection nodes.

14. A personal identification system as claimed in claim 13, wherein there is further included a wireline connection for coupling each of a plurality of said antenna preamplifier nodes to a predetermined one of said plurality of said collection nodes.

15. A personal identification system as claimed in claim 12, wherein there is included a radio frequency communication link for coupling said computer to each of a plurality of said collection nodes.

16. A personal identification system as claimed in claim 15, wherein there is further included a radio frequency communication link for coupling each of a plurality of said antenna preamplifier nodes to predefined ones of said plurality of collection nodes.

17. A personal identification system as claimed in claim 12, wherein said first and said second RF attenuation material each comprise a metallized plastic material.

18. A personal identification system as claimed in claim 17, wherein said metallized plastic material comprises static shielding bag material.

19. A personal identification system as claimed in claim 12, wherein said antenna includes a low gain antenna mounted in said interior of said enclosure, said low gain antenna for rejecting coded radio frequency signals from personal detector units located outside said interior of said enclosure.

20. An enclosure for a personal identification system comprising:

said enclosure having an interior and an open end;

RF attenuation means attached to said interior and to said open end of said enclosure;

a receiver for receiving coded radio frequency signals, said receiver mounted in said interior of said enclosure; and a personal detector unit attached to a user said personal detector unit for transmitting coded radio frequency signals to identify said user to said receiver when said personal detector unit is inserted into said interior of said enclosure.

* * * * *